(No Model.)

J. RIDDELL.
DEVICE FOR BORING SPHERICAL CAVITIES.

No. 508,640. Patented Nov. 14, 1893.

WITNESSES.
Alec F. Macdonald.
A. C. Crane.

INVENTOR.
John Riddell
by Bentley & Blodgett
Atty

UNITED STATES PATENT OFFICE.

JOHN RIDDELL, OF SAUGUS, ASSIGNOR TO THE THOMSON-HOUSTON ELECTRIC COMPANY, OF BOSTON, MASSACHUSETTS.

DEVICE FOR BORING SPHERICAL CAVITIES.

SPECIFICATION forming part of Letters Patent No. 508,640, dated November 14, 1893.

Application filed August 26, 1892. Serial No. 444,202. (No model.)

*To all whom it may concern:*

Be it known that I, JOHN RIDDELL, a citizen of the United States, residing at Saugus, county of Essex, and State of Massachusetts, have invented certain new and useful Improvements in Devices for Boring Spherical Cavities, of which the following is a specification.

My invention relates to boring machines, and especially to those adapted to bore spherical or bowl-shaped cavities. It is designed particularly for shaping the spherical bearings in the pillow blocks which support the armature shafts of dynamo electric generators and motors.

The invention consists in a head adapted to be attached to the spindle of a boring or drilling machine, and having a portion of its periphery circular and lying in the plane of the axis of rotation of the spindle and head. On the circular periphery is mounted a tool carrier. Means for adjusting the carrier are provided, whereby it is caused to revolve in smaller or larger circles, and at lower or higher levels respectively. Provision is also made for an automatic feeding of the carrier along the circular periphery of the head.

Figure 1:
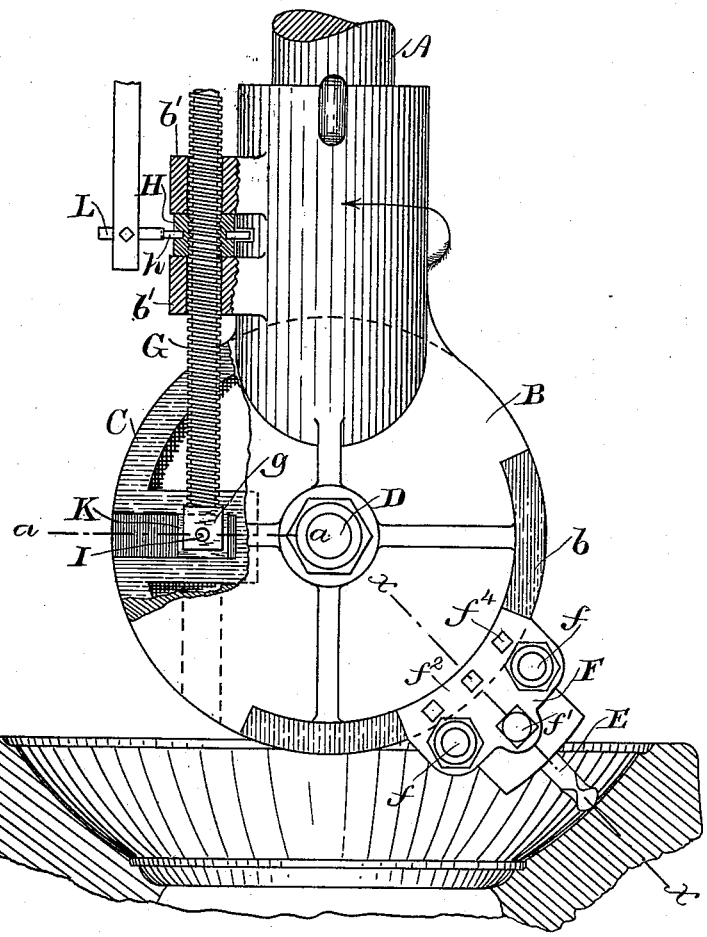
Figure 2:
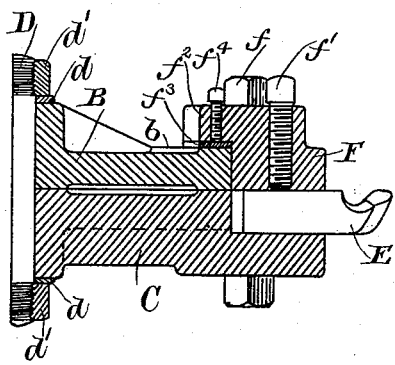
Figure 3:
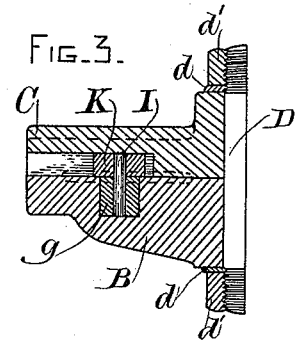

In the drawings Figure 1 is a side elevation of my device, partly broken away; the spherical bearing being shown in section. Fig. 2 is a section on the line $x-x$, and Fig. 3 is a section on the line $a-a$, of Fig. 1.

To the spindle A of the drilling machine, is secured by a collar integral therewith the head B, which has a portion of its periphery concentric with a transverse pin D intersecting the axis of rotation of the head. The circular periphery of the head, therefore, lies in the plane of the axis of rotation of the head. It is preferred to make the head in the shape of a flat, circular disk, as shown; though this is not essential. A second plate C of the same size as the head B, is mounted upon the pin D and revolves around it with its periphery bearing against the head B. At the point where plate C carries the tool E a boss or thickening is cast upon it as best shown in Fig. 2, and affords a support for the tool. A clamping piece F is secured to this boss or thickened part by the bolts $f\,f$ and is provided with a flange $f^2$ projecting over the head B and adapted to slide on a portion of its periphery $b$ which is dressed off to afford a working surface for the flange. To take up lost motion or wear washers $f^3$ are interposed, and adjusting screws $f^4$ are provided so that the tool carrier may rotate freely but will have no transverse motion. The tool E is held in place by the set screw $f'$.

Where the plate C rotates about the pin D it is provided with washers $d\,d$ and lock nuts $d'\,d'$ so that a perfectly firm bearing is provided for the tool.

When the head is rotated, the tool E is revolved in a circle concentric with the axis of the spindle A. By adjusting the carrier along the circular periphery of the head B the size of this circle and the level on which the tool revolves are altered, the point of the tool moving vertically in a circular path concentric with the pin D. Therefore, by adjusting the carrier, the tool can be caused to bore a spherical cavity concentric with the intersection of the pin D with the axis of the spindle.

Various devices may be used to adjust the carrier, or to give it an automatic feed along the circular periphery. It is preferred however, to use a screw G, placed in a vertical slot in the head B and passing up through two ears $b'$, between which is held a nut H engaging with said screw. By turning the nut this screw is moved axially in the slot. A lateral projection on the head $g$ of the screw, engages a radial groove in the tool carrier C, whereby the vertical movement of the screw causes the carrier to turn on the pin D. This lateral projection may be a simple pin; but it is preferred to use a block K fitted to slide in the groove, and pivotally connected with the head of the screw by a pin I.

When an automatic feed is to be given to the carrier, the nut H is provided with a number of radial arms $h$, which strike a fixed finger or tappet L as the head B rotates.

What I claim as new, and desire to secure by Letters Patent, is—

1. The combination with a rotatable head having a circular periphery lying in the plane of the axis of rotation, of a tool carrier mounted to slide on said circular periphery, and having a bearing on both sides of said head, substantially as described.

2. The combination with a rotatable head, having a circular periphery lying in the plane of the axis of rotation, of a tool carrier, mounted on an axis concentric with said periphery, and provided with a tool clamping piece overlapping said periphery, substantially as described.

3. The combination with a rotatable head, having a circular periphery lying in the plane of the axis of rotation, of a tool carrier adapted to slide on said periphery, and provided with a tool clamping piece overlapping said periphery, and means for adjusting said tool carrier, substantially as described.

4. The combination with a rotatable head, having a circular periphery lying in the plane of the axis of rotation, of a tool carrier adapted to slide on said periphery, a screw mounted in said head, and engaging with the tool carrier, and a nut for moving the screw axially, substantially as described.

5. The combination with a rotatable head, containing a vertical slot and having a circular periphery lying in the plane of the axis of rotation, of a screw mounted to slide in said slot, a nut to operate the screw, and a tool carrier mounted concentric with said circular periphery, and having a radial groove, engaged by a lateral projection on the head of the screw, substantially as described.

6. The combination with the head B, having the circular surface $b$, of the disk C, the tool E, the block F having a flange fitted to slide on the surface $b$, and means for adjusting said disk angularly with reference to said head, substantially as described.

7. The combination with the head B, of the disk C, having a radial groove, the center pin D, uniting the head and disk, the block F, the screw G, having a head $g$, the block K sliding in the slot in the disk and pivotally connected with said screw, the nut H engaging with the screw, and carrying arms $h$, and a stationary tappet L to turn said nut, substantially as described.

In witness whereof I have hereunto set my hand this 23d day of August, 1892.

JOHN RIDDELL.

Witnesses:
JOHN W. GIBBONEY,
BENJAMIN B. HULL.